(12) United States Patent
Leverenz

(10) Patent No.: US 6,754,889 B1
(45) Date of Patent: Jun. 22, 2004

(54) JAVA AUTOMATION, TESTING, AND ANALYSIS

(75) Inventor: Neal T. Leverenz, Detroit, MI (US)

(73) Assignee: Compuware Corporation, Detroit, MI (US)

(*) Notice: Subject to any disclaimer, the term of this patent is extended or adjusted under 35 U.S.C. 154(b) by 336 days.

(21) Appl. No.: 09/684,681

(22) Filed: Oct. 4, 2000

(51) Int. Cl.[7] ............................................... G06F 9/44
(52) U.S. Cl. ..................... 717/127; 717/116; 717/118; 717/166; 717/128; 717/147; 717/148
(58) Field of Search ............................. 717/108, 116, 717/118, 124, 139, 148, 166, 178, 127, 128, 130, 131, 147; 713/190, 200, 2, 193; 709/203

(56) References Cited

U.S. PATENT DOCUMENTS

| | | | | |
|---|---|---|---|---|
| 5,872,796 A | * | 2/1999 | Golshan et al. | 714/727 |
| 5,935,249 A | * | 8/1999 | Stern et al. | 713/201 |
| 6,072,953 A | * | 6/2000 | Cohen et al. | 717/166 |
| 6,192,476 B1 | * | 2/2001 | Gong | 713/201 |
| 6,195,774 B1 | * | 2/2001 | Jacobson | 714/727 |
| 6,243,105 B1 | * | 6/2001 | Hoyer et al. | 345/440 |
| 6,282,702 B1 | * | 8/2001 | Ungar | 717/148 |
| 6,289,506 B1 | * | 9/2001 | Kwong et al. | 717/148 |
| 6,308,274 B1 | * | 10/2001 | Swift | 713/201 |
| 6,339,841 B1 | * | 1/2002 | Merrick et al. | 717/166 |
| 6,345,361 B1 | * | 2/2002 | Jerger et al. | 713/200 |
| 6,418,444 B1 | * | 7/2002 | Raduchel et al. | 707/103 Z |
| 6,468,538 B1 | * | 10/2002 | Rodriguez Garcia et al. | 713/190 |
| 6,470,378 B1 | * | 10/2002 | Tracton et al. | 709/203 |
| 6,505,192 B1 | * | 1/2003 | Godwin et al. | 707/3 |
| 6,507,805 B1 | * | 1/2003 | Gordon et al. | 702/186 |
| 6,513,060 B1 | * | 1/2003 | Nixon et al. | 709/203 |
| 6,513,155 B1 | * | 1/2003 | Alexander et al. | 717/124 |
| 6,546,548 B1 | * | 4/2003 | Berry et al. | 717/128 |
| 6,553,564 B1 | * | 4/2003 | Alexander et al. | 717/128 |
| 6,598,012 B1 | * | 7/2003 | Berry et al. | 702/187 |

OTHER PUBLICATIONS

Title: Jres: a resource accounting interface for Java, author: Czajkowski et al, ACM, 1998.*
Title: An extensible probe architecture for network protocols for computer communications, author: Malan et al, ACM, 1998.*
Title: Extensible security architectures for Java, Authors: Wallach et al, ACM, 1997.*
Title: Security and Dynamic Class Loading in Java: A Formalisation, Author: Jensen, IEEE, 1997.*
Title: The Security of Static Type with Dynamic Linking, Author: Drew Dean, ACM, 1997.*
Title: Java security: from HotJava to Netscape and beyond, author: Dean, D et al, IEEE, 1997.*
Title: Extensible Security Architecture for Java, author: Wallach et al, ACM, 1997.*

\* cited by examiner

*Primary Examiner*—Chameli Chaudhuri Das
(74) *Attorney, Agent, or Firm*—Fenwick & West LLP

(57) ABSTRACT

A system and method are disclosed for enabling injection of non-native code into a JAVA environment. The method provides a software hook for detecting the loading of a JAVA interpreter, and then creates a connection that communicates with an executing JAVA application. A method is also provided that loads in a customized CLASSLOADER module, wherein the customized CLASSLOADER module identifies a location of non-native code, and then loads in the non-native code identified by the customized CLASSLOADER module.

21 Claims, 3 Drawing Sheets

JAVA AUTOMATION, TESTING, AND ANALYSIS

BACKGROUND OF THE INVENTION

1. Field of the Invention

The present invention relates generally to the field of automation, testing, and analysis of computer programs, and specifically to the field of automation, testing, and analysis of a JAVA™ application running inside a JAVA™ virtual machine.

2. Description of Background Art

For JAVA applications to execute in a WINDOWS™ environment, the JAVA application must be executed by a JAVA virtual machine. JAVA is an interpretive language that is compiled to an intermediate format that can then be executed upon a multitude of different operating systems and processors. A JAVA virtual machine provides the communication/translation layer between the hardware, operating system, and the JAVA application being executed by the JAVA virtual machine. This design enables JAVA applications to be executed by any operating system for which the JAVA virtual machine is compiled. Typically, the JAVA application runs on what is termed a sandbox or blackbox, and therefore the JAVA application has little or no access to the underlying operating system. Conversely, the interface provided by the JAVA virtual machine also limits operating system access to the JAVA application. This limits the ability of a monitoring program executing in the operating system to access the underlying code of an executing JAVA application to monitor the performance of the JAVA application. Monitoring programs typically access the code of an executing program by analyzing the windows created by the executing program. For example, if the monitoring program and executing program are both WINDOWS-based, a monitoring program may use WINDOWS provided information about the window displayed for the executing program. The window information allows a monitoring program to modify and monitor the executing program. JAVA also uses windows within its own internal environment. For every JAVA window, a WINDOWS window object is created. However, the JAVA windows do not appear as windows to the WINDOWS operating system. For example, a displayed button that a user can press in a WINDOWS environment is a window in WINDOWS, and thus a program can monitor and access the program creating the button. Within the JAVA environment, a JAVA button appears in JAVA as a JAVA object. However, a button created by a JAVA application appears to WINDOWS as a painted object, i.e., it does not appear as a window. This is true for all windows displayed by a JAVA application. Therefore, to gain access to the information regarding a JAVA window, a calling program must determine which of the window objects being maintained by WINDOWS correspond to the JAVA windows. To do that, the calling program must gain access to the JAVA virtual machine.

There are three conventional 3 methods of obtaining access to the JAVA environment maintained by a JAVA virtual machine:

1. For a MICROSOFT™ Corporation JAVA virtual machine (including Internet Explorer), a program desiring to obtain access to a JAVA virtual machine uses a software hook provided by MICROSOFT through a registry setting.
2. For early versions of SUN™ machine (this includes virtual machines created by IBM™, BORLAND™ or SYMANTEC™), SUN provides an accessibility hook that allows a calling program to access the JAVA virtual machine by setting variables in a properties file. For example, the awt.properties file contains a setting called AWT.assistive_technologies=<some JAVA class> that can be used to load extra JAVA code when the JAVA virtual machine initializes.
3. For SUN's virtual machine after version 1.1.7, a calling program will have the option to use a software hook provided by SUN through setting an environment variable or through a command line option.

Each of these methods has flaws which makes it a less ideal solution for a calling program that needs access to the JAVA virtual machine.

MICROSOFT's and SUN's Virtual Machines (Using Software Hooks)

For MICROSOFT's virtual machine, the calling program sets the registry to enable the calling program to be called when a JAVA application starts. For the SUN virtual machine, the calling program sets the necessary environment variable that will enable the calling program to be called when a JAVA application starts. To allow the calling program's support files to be loaded, the calling program must set the CLASSPATH to point to the calling program's JAVA support files. CLASSPATH is the WINDOWS statement that tells JAVA where to find programs. This method does not require a user to modify any files to enable access to the virtual machines. However, if the CLASSPATH or registry settings are modified by other programs, the calling program will not be able to access the JAVA virtual machine. As many programs override the CLASSPATH and PATH settings, this solution may be impractical. Moreover, the calling program is dependent upon MICROSOFT and SUN for providing the software hook to allow access to the JAVA virtual machine. Finally, for SUN's 1.2. x and 1.3. x VM's, a calling program must copy supporting JAVA code to the ext of the JVM to obtain less restrictive system permissions. SUN's Virtual Machines (Using SUN's Accessibility)

If the calling program is using SUN's virtual machine or a virtual machine compatible with SUN's virtual machine, the calling program must modify the awt.properties file in the 'lib' directory of the JAVA virtual machine. This will tell the interpreter to call the calling program when loading a JAVA application. The calling program also sets the CLASSPATH to point to the calling program's JAVA support files to enable the support files to be accessed by the JAVA virtual machine. This method also does not require the user to modify any files if the user is using only one JAVA virtual machine. However, similar to the above method, if the CLASSPATH is modified by other programs, the calling program will be unable to access the JAVA virtual machine. Additionally, the calling program is dependent on SUN for providing the accessibility hook, and if the user has more than one JAVA virtual machine installed on his computer, the user must write special batch files to set the location of the JAVA virtual machine he wants to use and make changes to that JAVA virtual machine's awt.properties file, a cumbersome process for most users.

Therefore, a system, method, and apparatus are needed to enable a calling program to reliably and effectively gain access to a JAVA virtual machine.

SUMMARY OF THE INVENTION

The present invention provides a system and method for enabling injection of non-native code into a JAVA environment. In a preferred embodiment, the method provides a software hook for detecting the loading of a JAVA interpreter, and then creates a connection that communicates with an executing JAVA application. In one embodiment, the present invention provides a method that loads in a customized CLASSLOADER module, wherein the customized CLASSLOADER module identifies a location of non-native code, and then loads in the non-native code identified by the customized CLASSLOADER module. In a further embodiment, in an environment that maintains a default security manager, a method in accordance with the present invention loads a custom security manager into memory by the CLASSLOADER module, and prior to loading in the CLASSLOADER module, performs the steps of disabling the default security manager, and, after loading in the CLASSLOADER module, modifying the default security manager to enable functionality performed by the non-native code. In a further embodiment, the method comprises the steps of determining whether the JAVA environment is created by NETSCAPE NAVIGATOR, responsive to determining that the JAVA environment is created by NETSCAPE NAVIGATOR, setting a NETSCAPE internal CLASSPATH to point to a customized CLASSLOADER module, loading in a customized CLASSLOADER module, wherein the customized CLASSLOADER module identifies a location of non-native code; and loading in the non-native code identified by the customized CLASSLOADER. The features and advantages described in the specification are not all inclusive, and particularly, many additional features and advantages will be apparent to one of ordinary skill in the art in view of the drawings, specification, and claims hereof Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENTS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Currently, all JAVA interpreters developed for the WINDOWS platform are based on SUN's JAVA virtual machine specifications. A JAVA interpreter is a program that converts machine-independent JAVA byte code into machine code compatible with the machine upon which the JAVA byte code is executing. All companies wishing to support JAVA must either write a JAVA interpreter that follows the specifications laid out by SUN or use one of SUN's JAVA interpreters directly. The JAVA interpreter must support a minimum set of exported functions that allow for the creation, manipulation, and destruction of a JAVA virtual machine. On the WINDOWS platform, an interpreter is implemented as a dynamic link library (DLL). The following table lists some of the known JAVA virtual machines and their corresponding DLLs.

| Company | Version | DLL |
|---|---|---|
| SUN | 1.1.0–1.1.8 | JAVAi.dll |
| Borland | | JAVA_g.dll |
| Symantec | | |
| IBM | | |
| Oracle | | |
| SUN | 1.2.x & 1.3.x | Jvm.dll |
| IBM | | |
| MICROSOFT | 3166+ | MsJAVA.dll |
| NETSCAPE | 4.05 & 4.5 | Jrt3240.dll |

When a calling program needs to load a JAVA application to perform some functionality, the calling program first loads an interpreter (one of the DLLs listed in the above table). After the interpreter has successfully loaded into memory, the calling program then calls JNI_GetDefaultJAVAVMInitArgs to obtain the default environment from the interpreter. The environment is what the JAVA virtual machine uses to configure itself on startup. The calling program then modifies the default environment to allow access to the JAVA virtual machine. Exemplary parameters that are typically modified include the CLASSPATH (the search path for JAVA applications), the name of the JAVA application being called, and any arguments that are needed to execute that JAVA application. After the calling program has set the environment, the calling program passes the environment to JNI_CreateJAVAVM, a command string common to all JAVA environments. This command string causes the JAVA interpreter to accept the modified environment, load the JAVA application into memory, and wait for further instructions. The calling program must then tell the interpreter to start the JAVA virtual machine and wait for the virtual machine to die.

Figure 1:
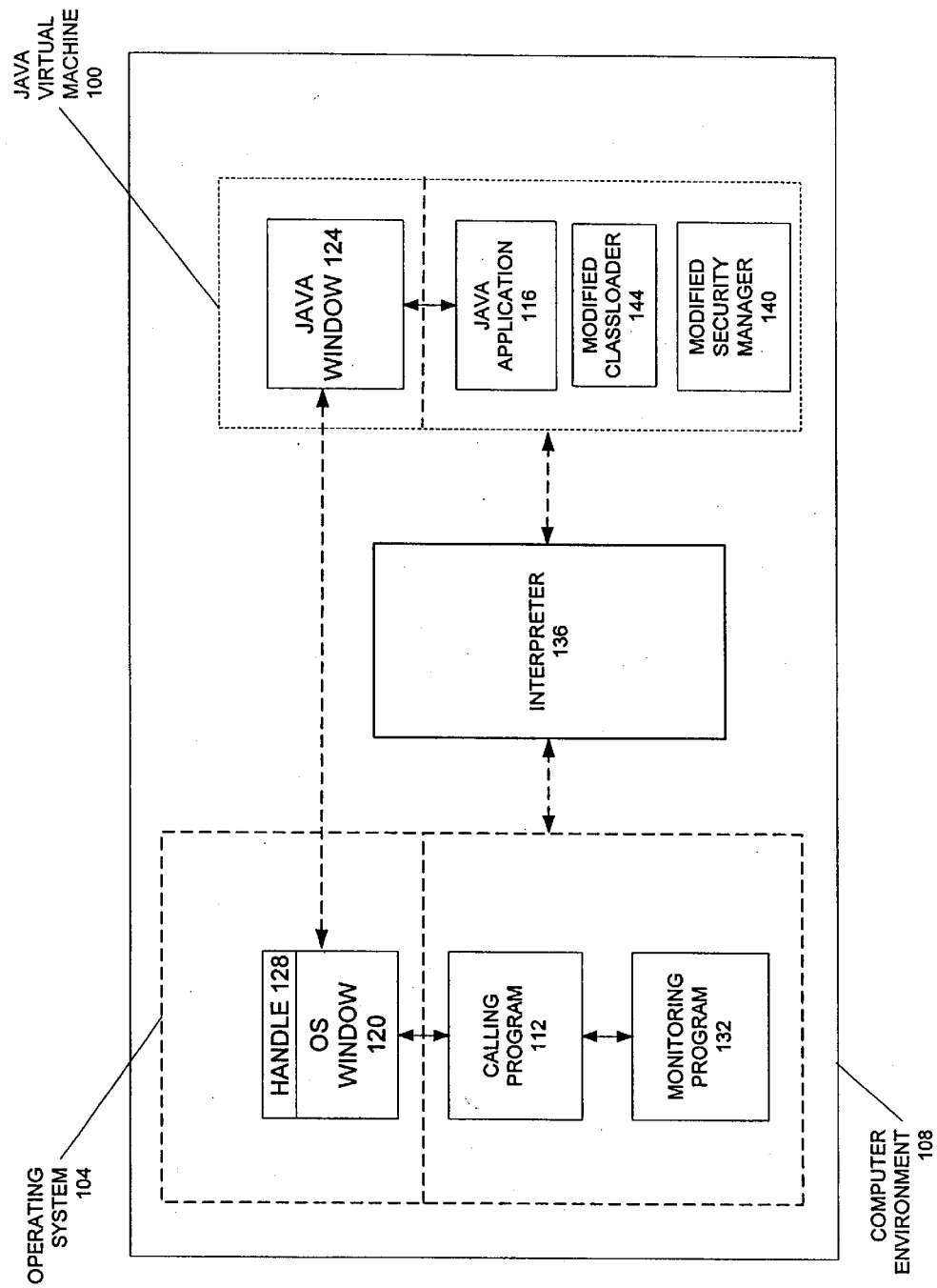
FIG. 1 is a block diagram of the overall architecture of an embodiment of a computer system accessing a JAVA virtual machine in accordance with the present invention.

Referring now to FIG. 1, there is shown a block diagram of the overall architecture of a computer environment 108 in which an operating system 104 provides a first operating environment and a JAVA virtual machine 100 provides a second operating environment. The first operating system 104 may be WINDOWS from MICROSOFT Corporation, UNIX, Linux, or any other operating system capable of interoperating with JAVA. The second environment is preferably a JAVA environment as typically implemented by a JAVA virtual machine 100. The environments typically reside on a personal computer, a workstation, a terminal, a PDA, or any computing device. A JAVA application 116 is shown as being coupled to the JAVA virtual machine 100 for execution. A calling program 112 that calls the JAVA application 116 is shown as being coupled to the operating system 104. As discussed above, JAVA is an interpretive language that is complied to an intermediate format that can run on a multitude of different operating systems and processors. The JAVA virtual machine 100 provides the communication/translation layer between the hardware, operating system 104, and the JAVA application 116 being executed by the JAVA virtual machine 100.

Within the JAVA environment, after being called by a calling program 112, a JAVA application 116 may generate JAVA windows 124 during the course of its execution. In the operating system environment, however, those JAVA windows 124 may appear as operating system windows 120 or objects. If there are multiple JAVA windows 124 generated by a JAVA application, multiple operating system windows 120 or objects may be displayed. However, no one-to-one correspondence is provided to a conventional monitoring program regarding the JAVA windows 124 and the operating system windows 120. Therefore, a conventional monitoring program that seeks information regarding the JAVA application 116 is unable to determine this information by analyzing the operating system environment without modifying the JAVA environment itself or modifying the CLASSPATH.

However, the monitoring program 132 in accordance with the present invention is able to determine JAVA information from an operating system environment 104 without modifying the CLASSPATH or the JAVA environment. A monitoring program 132 of the present invention can be any program that desires to interface with a JAVA virtual machine 100 and is resident in the operating system 104 as shown in FIG. 1. For example, a monitoring program 132 may be a debugger, class analyzer, provide automation tools, or the like. In one embodiment, the monitoring program 132 calls an interpreter 136 that is coupled to both the operating system 104 and the JAVA virtual machine 100 to enable access to the JAVA virtual machine 100. In a further embodiment, as discussed below, the interpreter 136 also creates a modified security manager 140 that enables the monitoring program 132 to provide additional functionality, and a modified CLASSLOADER 144 that provide the ability to load additional classes if needed, both of which reside within the JAVA virtual machine 100.

Figure 2:
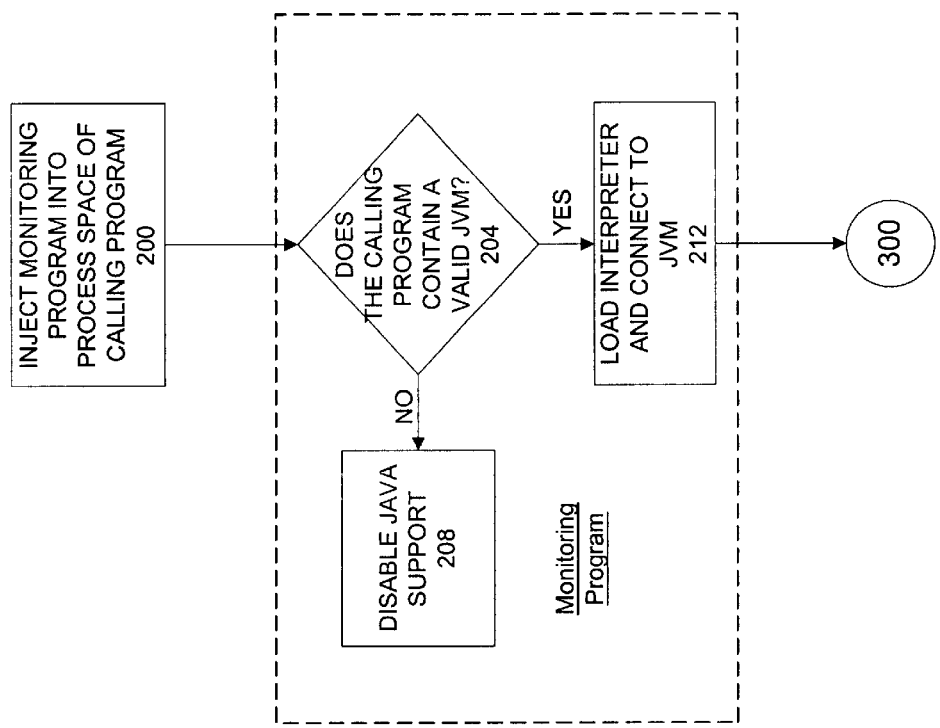
FIG. 2 is a flow chart illustrating a method of initiating a custom JAVA interpreter in accordance with the present invention.

FIG. 2 illustrates a method of obtaining information regarding a JAVA application from an operating system environment. First, a monitoring program 132 is injected 200 into the process space of the calling program 112. Although the term 'program' is used to describe the monitoring program 132 and calling program 112, the programs may be implemented as modules in hardware, firmware, or the like. In one embodiment, injecting the monitoring program (DLL) into a running process is accomplished by setting up an operating system call back that loads the monitoring program 132 into the running process and then starts the monitoring program 132. An operating system call back is a method that is called by the operating system for each process. The monitoring program 132 is typically injected approximately at the same time as when the calling program 112 creates its first window, which is usually at initialization.

Then, the monitoring program 132 determines 204 whether the calling program 112 has called or will call a JAVA application 116. One method for determining whether the calling program 112 has called or will call a JAVA application 116 is to examine the memory of the executing computer. If a JAVA DLL is present in memory, the monitoring program 132 assumes that the calling program 112 has called or will call a JAVA application 116. In one embodiment, the monitoring program 132 performs this functionality by issuing a JNI_GetCreatedJAVAVMs command. This command will attach to a running JVM in memory or will return false if there are no running JVMs. Other methods of detecting whether the calling program 112 has called or will call a JAVA application 116 may also be used, for example, by examining the class names of all windows that are created in the process.

If the monitoring program determines that the calling program 112 will not be calling a JAVA application 116, in one embodiment, the monitoring program 132 disables 208 JAVA support for the calling program 112. In this embodiment, the monitoring program 132 performs other monitoring functionalities, and therefore continues to execute its other functionalities. In an embodiment where the monitoring program 132 does not perform other functionalities, the monitoring program preferably terminates execution.

Figure 3:
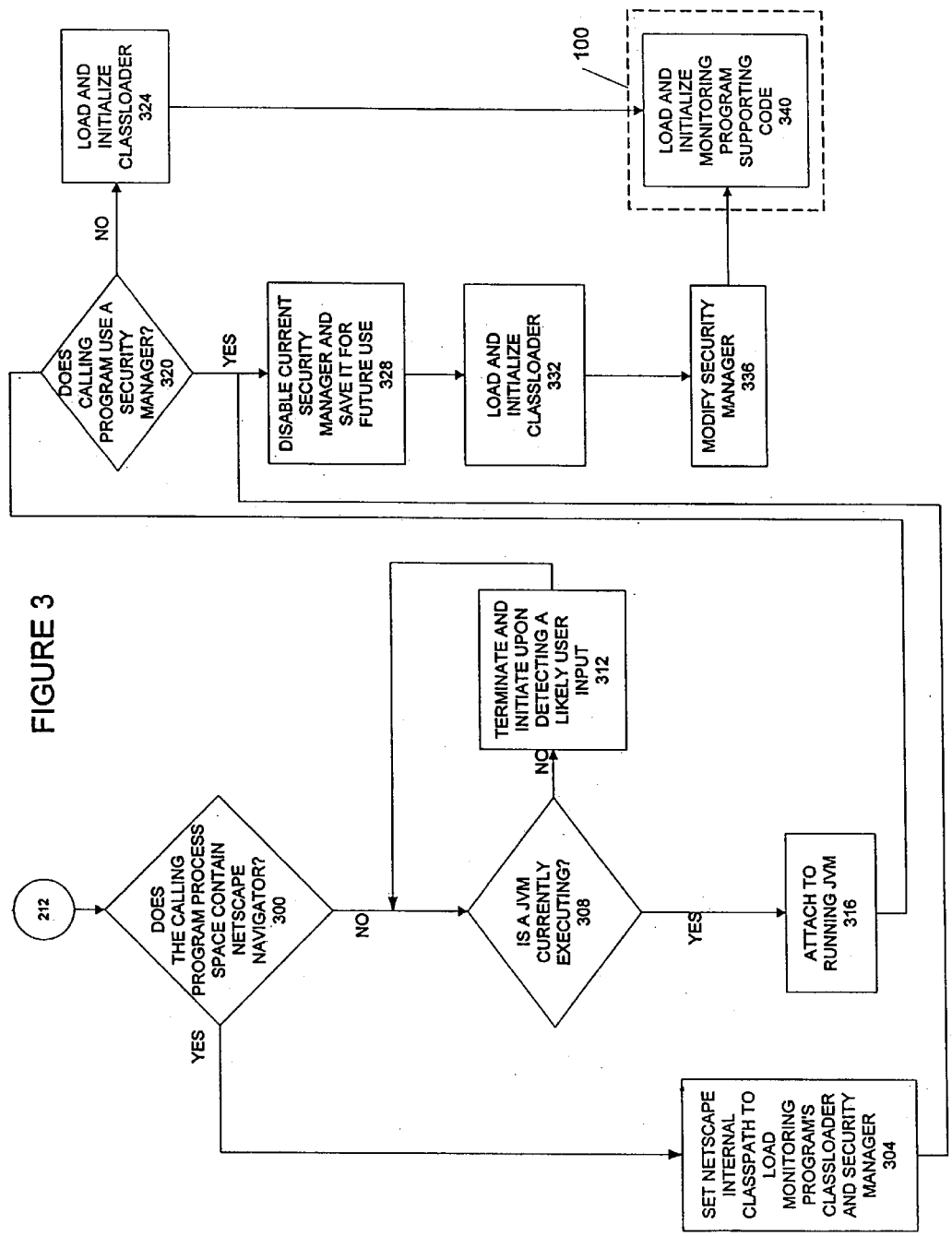
FIG. 3 is a flow chart illustrating a method of providing code to a JAVA virtual machine.

If the calling program 112 has called a JAVA application 116, the monitoring program 132 loads 212 a custom JAVA interpreter 136 into memory and connects to the JAVA virtual machine 100, using the standard set of API methods exposed by the JAVA virtual machine 100 to allow a process to communicate with the JAVA virtual machine 100. In one embodiment, a custom JAVA interpreter 136 is an extension DLL that is injected into the process space that enables the monitoring program 132 to communicate to the JAVA virtual machine 100. One embodiment of the operation of the interpreter 136 is shown in FIG. 3. The interpreter 136 determines 300 whether the calling program contains NETSCAPE NAVIGATOR™. In one embodiment, this is accomplished by examining memory for the presence of a specific JVM DLL used by NETSCAPE. In one embodiment, the type of JAVA virtual machine 100 being used by the computer system 108 is determined by calling a GetModuleHandle ("XXX") function where XXX is a specific JAVA virtual machine type (e.g., SUN, MICROSOFT, NETSCAPE). If the function returns false, the interpreter 136 knows that the specific JVM type requested is not present.

If NETSCAPE NAVIGATOR is not being used, the interpreter 136 determines 308 whether a JAVA virtual machine 100 is currently executing. If a JAVA virtual machine 100 is not executing, the monitoring program 132 preferably terminates 312 the JAVA support portion of its functionality and waits for a user to initiate a JAVA application. This is preferably accomplished by monitoring mouse clicks or other input device actions generated by the user and determining whether a JAVA window is implicated by the input device. If it is, the monitoring program 132 determines again whether a JAVA virtual machine 100 is executing. Once the JAVA virtual machine 100 is executing, in a non-NETSCAPE NAVIGATOR environment, the interpreter 136 attaches 316 to the executing JAVA virtual machine 100. In one embodiment, the interpreter 136 calls the Define Class command. The Define Class command is used to load a custom security manager and a class loader into memory. This is accomplished by setting the memory pointer field of the Define Class command to point to the appropriate location in memory that maintains the security manager and class loader. In this embodiment, the monitoring program 132 decrypts and loads the files from storage into memory prior to calling the Define Class command. Thus, in a non-NETSCAPE environment, the non-native code is injected into the JAVA environment without requiring modification of the CLASSPATH.

In a NETSCAPE environment, NETSCAPE does not allow loading of encrypted data into a JAVA environment. Accordingly, for a NETSCAPE environment, the JAVA interpreter 136 causes NETSCAPE to set 304 the internal NETSCAPE CLASSPATH to load the monitoring program's classfiles and the monitoring program's security manager. This is preferably accomplished by using the Find Class command which then looks at the CLASSPATH to determine what files to load. The interpreter 136 modifies the CLASSPATH to indicate the location in memory or on the hard disk associated with the interpreter 136 files, in a decrypted state. Thus, when the Find Class command is executed, NETSCAPE loads the appropriate unencrypted files into memory. Therefore, in a NETSCAPE environment, by modifying the CLASSPATH at the time of execution, the monitoring program 132 does not have to account for other programs changing the CLASSPATH and thereby disabling the monitoring program functionality.

Another obstacle to monitoring a JAVA application is the internal JAVA security manager that may prevent applications from performing certain functionality such as writing to the local disk. Therefore, the interpreter 136 determines 320 whether the JAVA virtual machine 100 uses a security manager. If there is not a security manager, the interpreter 136 simply loads 324 the supporting non-native code for the monitoring program 132 to perform whatever functionality is desired. The non-native code provides the enhanced functionality to the executing JAVA virtual machine 100 desired by the monitoring program 132. If there is a security manager, the interpreter 136 temporarily disables 328 the security manager and saves the security manager for future use. In one embodiment, the interpreter 136 disables the security manager by setting a memory pointer provided in the JAVA virtual machine 100 that indicates where the JAVA default security manager is located to a null value. For example, the interpreter 136 may execute a series of commands such as jobject nsm=0; nsm=getNullSM( ) and a series of JAVA API calls to set the JAVA default security manager to a null value. Modification of this pointer is only possible by a local environment, i.e., a remote program could not reset the security manager memory pointer of a JAVA virtual machine 100 to disable the security manager. Then, the interpreter 136 loads 332 and initializes a custom classloader statement. The default classloader only examines files identified in the CLASSPATH. However, the modified classloader is designed to identify the non-native code located elsewhere in the computer. If those files are encrypted, then the modified classloader also can identify the decrypting program used to decrypt the encrypted files. In one embodiment, the classloader is modified to load in custom hooking software that allows the monitoring program 132 to know whenever a JAVA application is called. The non-native monitoring program code may also be attached to the JAVA virtual machine 100 by using DEFINE CLASS as discussed above; however, in a preferred embodiment, a modified classloader statement is employed because this solution requires less processing.

Next, the interpreter 136 modifies 336 the security manager. As discussed above, many JAVA security managers prohibit functionality such as writing to a local disk that may be useful for a monitoring program 132. Thus, a modified security manager 140 is used in place of the default security manager. In this embodiment, the memory pointer previously set to null is set to point to the memory location of the new security manager code which was previously loaded into memory as discussed above. The new security manager code enables the JAVA virtual machine 100 to perform the previously prohibited functionality. The new security manager code also points back to the default security manager to allow other security manager functions to be performed.

Then, the JAVA virtual machine 100 will load 340 and initialize monitoring program code. With the monitoring program code being executed by the JAVA virtual machine 100, the monitoring program 132 can determine any information it desires regarding the JAVA application. As the JAVA virtual machine 100 maintains a list of all windows in JAVA, the monitoring program can now determine the correspondence between a JAVA window 124 and an operating system window 120 by comparing the parameters of the windows 120, 124 such as their physical location. Thus, the present invention can be used to monitor performance, monitor use of system resources, and debug JAVA applications without relying on third party software or a pre-defined CLASSPATH.

Although specific browsers and JAVA virtual machines are described herein, the description is not intended to limit the present invention to those specific implementations. Rather, any browsers or JAVA virtual machines possessing similar characteristics as the characteristics described herein may also be used in accordance with the present invention.

What is claimed is:

1. A method of introducing non-native code into a platform-independent environment, comprising:

loading a customized CLASSLOADER module, wherein the customized CLASSLOADER module identifies a location of the non-native code;

loading the non-native code identified by the customized CLASSLOADER module to introduce the non-native code into the platform-independent environment; and executing the non-native code to enable a program executing in an operating system to monitor performance in the platform-independent environment without modifying the platform-independent environment.

2. The method of claim 1 wherein the platform-independent environment maintains a default security manager, further comprising:

loading a custom security manager;

prior to loading the customized CLASSLOADER module, disabling the default security manager; and after loading the customized CLASSLOADER module, setting a pointer that points to a memory location of the default security manager to point to a memory location of the custom security manager.

3. The method of claim 2, wherein disabling the default security manager comprises:

setting a pointer that points to a memory location of the default security manager to a null value.

4. The method of claim 2 further comprising, after setting the pointer, disabling functionality of the default security manager.

5. The method of claim 4 further comprising, after disabling functionality, redirecting control back to the default security manager.

6. The method of claim 1, wherein monitoring performance in a platform-independent environment comprises one element of a set containing debugging, analyzing a class, and providing an automation tool.

7. The method of claim 1 wherein the platform-independent environment comprises one of a set containing Java™ Runtime Environment from Sun Microsystems, Incorporated and Java™ Virtual Machine from Microsoft Corporation.

8. A method of introducing non-native code into a platform-independent environment, comprising:

responsive to determining that the platform-independent environment was created by a program that does not allow encrypted data to be loaded into a platform-independent environment, setting an internal CLASSPATH of that program to point to a customized CLASSLOADER module;

loading the customized CLASSLOADER module, wherein the customized CLASSLOADER module identifies a location of non-native code; and loading the non-native code identified by the customized CLASSLOADER module.

9. The method of claim 8 wherein the platform-independent environment maintains a default security manager, further comprising;

loading a custom security manager;

prior to loading the customized CLASSLOADER module, disabling the default security manager; and after loading the customized CLASSLOADER module, setting a pointer that points to a memory location of the default security manager to point to a memory location of the custom security manager.

10. The method of claim 8 wherein:

the customized CLASSLOADER module is not encrypted.

11. The method of claim 8, wherein that program is NETSCAPE NAVIGATOR.

12. The method of claim 8 wherein the platform-independent environment comprises one of a set containing Java™ Runtime Environment from Sun Microsystems, Incorporated and Java™ Virtual Machine from Microsoft Corporation.

13. A computer-readable medium for storing instructions for introducing non-native code into a platform-dependent environment, the instructions causing a processor to:

load a customized CLASSLOADER module, wherein the customized CLASSLOADER module identifies a location of the non-native code;

load the nonactive code identified by the customized CLASSLOADER module to introduce the non-native code into the platform-independent environment; and executing the non-active code to enable a program executing in an operating system to monitor performance in the platform-independent environment without modifying the platform-independent environment.

14. The computer-readable medium of claim 13 wherein the platform-independent environment maintains a default security manager, and wherein the instructions further cause the processor to:

load a custom security manager;

disable the default security manager prior to causing the processor to load the customized CLASSLOADER module; and set a pointer that points to a memory location of the default security manager to point to a memory location of the custom security manager after having caused the processor to load the customized CLASSLOADER module.

15. The computer-readable medium of claim 14, wherein the instructions for causing the processor to disable the default security manager cause the processor to:

set a pointer that points to a memory location of the default security manager to a null value.

16. The computer-readable medium of claim 13 wherein the platform-independent environment comprises one of a set containing Java™ Runtime Environment from Sun Microsystems, Incorporated and Java™ Virtual Machine from Microsoft Corporation.

17. A system for providing access to a platform-independent environment to a monitoring program, comprising;

a monitoring program module, resident in the operating system environment, for initiating an interpreter module responsive to determining that a calling program is accessing the platform-independent environment; and an interpreter module, for loading, responsive to being initiated, a customized CLASSLOADER module, wherein the customized CLASSLOADER module identifies a location of non-native code to a calling program module and requires the calling program module to load the non-native code identified by the customized CLASSLOADER module wherein the monitoring program does not modify the platform-independent environment.

18. The system of claim 17, wherein the interpreter loads the customized CLASSLOADER module by issuing a Define Class command.

19. The system of claim 17, wherein the interpreter analyzes the platform-independent environment to determine whether the platform-independent environment was created by a program that does not allow encrypted data to be loaded into a platform-independent environment.

20. The system of claim 17 further comprising a modified security manager module for enabling functionality to be performed by the monitoring program module that otherwise would be prohibited.

21. The system of claim 17 wherein the platform-independent environment comprises one of a set containing Java™ Runtime Environment from Sun Microsystems, Incorporated and Java™ Virtual Machine from Microsoft Corporation.

* * * * *

UNITED STATES PATENT AND TRADEMARK OFFICE
CERTIFICATE OF CORRECTION

PATENT NO.    : 6,754,889 B1
DATED         : June 22, 2004
INVENTOR(S)   : Neal T. Leverenz It is certified that error appears in the above-identified patent and that said Letters Patent is hereby corrected as shown below:

Title page,
Item [56], References Cited, U.S. PATENT DOCUMENTS, please replace "6,468,538 B1 * 10/2002 Rodriguez Garcia et al.... 713/190" with -- 6,463,538 * 10/2002 Elteto ... 713/190--. U.S. Patent 6,463,538 was cited by the examiner in an office action dated 2-20-2003, a copy of which is attached.

Column 9,
Line 19, please replace "platform-dependent" with -- platform-independent --.

Signed and Sealed this

Seventh Day of September, 2004

JON W. DUDAS
*Director of the United States Patent and Trademark Office*